United States Patent
Bryant

(10) Patent No.: US 10,198,428 B2
(45) Date of Patent: Feb. 5, 2019

(54) METHODS AND SYSTEMS FOR TEXTUAL ANALYSIS

(71) Applicant: ACT, INC., Iowa City, IA (US)

(72) Inventor: William Bryant, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 1157 days.

(21) Appl. No.: 14/270,517

(22) Filed: May 6, 2014

(65) Prior Publication Data

US 2015/0324330 A1 Nov. 12, 2015

(51) Int. Cl.
| | | |
|---|---|---|
| *G06F 17/21* | (2006.01) | |
| *G06F 17/27* | (2006.01) | |
| *G09B 5/00* | (2006.01) | |
| *G09B 7/00* | (2006.01) | |
| *G09B 19/00* | (2006.01) | |

(52) U.S. Cl.
CPC ............ *G06F 17/274* (2013.01); *G06F 17/21* (2013.01); *G09B 5/00* (2013.01); *G09B 7/00* (2013.01); *G09B 19/00* (2013.01)

(58) Field of Classification Search
CPC .. G09B 7/00; G09B 19/00; G09B 5/00; G06F 17/27; G06F 17/2775; G06F 17/30705; G06F 17/24; G06F 17/274; G06F 17/30702
See application file for complete search history.

(56) References Cited

U.S. PATENT DOCUMENTS

| | | |
|---|---|---|
| 5,371,673 A | 12/1994 | Fan |
| 6,115,683 A | 9/2000 | Burstein |
| 6,181,909 B1 | 1/2001 | Burstein |
| 7,013,259 B1* | 3/2006 | Polanyi ............... G06F 17/2785 704/1 |
| 7,373,102 B2 | 5/2008 | Deane |
| 7,822,768 B2 | 10/2010 | Maymir-Ducharme |
| 7,831,196 B2 | 11/2010 | Attali |
| 7,835,902 B2 | 11/2010 | Gamon |
| 7,930,300 B2 | 4/2011 | Colbran |
| 8,147,250 B2 | 4/2012 | Deane |
| 8,202,098 B2 | 6/2012 | Attali |
| 2004/0067472 A1* | 4/2004 | Polanyi ................... G09B 5/02 434/178 |
| 2004/0175687 A1* | 9/2004 | Burstein ................. G06F 17/27 434/353 |
| 2005/0142529 A1* | 6/2005 | Andreyev ................ G09B 7/02 434/362 |
| 2005/0175974 A1* | 8/2005 | Hansen .................... G09B 7/00 434/322 |
| 2006/0003303 A1* | 1/2006 | Almond ................... G09B 7/02 434/322 |

(Continued)

*Primary Examiner* — Nathan Hillery
(74) *Attorney, Agent, or Firm* — Sheppard Mullin Richter & Hampton LLP

(57) ABSTRACT

Computer-implemented methods and systems for textual analysis by generating models of the progression of writing and writing abilities are provided. A set of examinee-generated responses for one or more test items may be identified based upon at least one index. One or more data-based profiles may be assembled from the identified set of examinee-generated responses. Writing characteristics may be quantified from the assembled one or more data-based profiles based on the at least one index.

8 Claims, 19 Drawing Sheets

(56) References Cited

U.S. PATENT DOCUMENTS

| | | | |
|---|---|---|---|
| 2006/0129383 A1* | 6/2006 | Oberlander | G06F 17/274 704/10 |
| 2006/0189903 A1* | 8/2006 | Poreh | A61B 5/1122 600/595 |
| 2006/0282306 A1* | 12/2006 | Thissen-Roe | G06Q 10/06 705/7.14 |
| 2007/0073748 A1* | 3/2007 | Barney | G06F 17/30675 |
| 2007/0077542 A1* | 4/2007 | Burstein | G06F 17/27 434/156 |
| 2007/0218450 A1 | 9/2007 | MacClay | |
| 2007/0238084 A1* | 10/2007 | Maguire | G09B 7/02 434/353 |
| 2008/0187898 A1* | 8/2008 | Hattie | G09B 7/00 434/350 |
| 2009/0176198 A1 | 7/2009 | Fife | |
| 2009/0190839 A1 | 7/2009 | Higgins | |
| 2009/0197225 A1 | 8/2009 | Sheehan | |
| 2009/0313540 A1 | 12/2009 | Otuteye | |
| 2011/0071956 A1* | 3/2011 | Pinto | G06F 17/50 705/348 |
| 2012/0070062 A1* | 3/2012 | Houle | G06K 9/00154 382/137 |
| 2012/0088219 A1 | 4/2012 | Briscoe | |
| 2012/0150534 A1 | 6/2012 | Sheehan | |
| 2012/0278321 A1* | 11/2012 | Traub | G06F 17/30657 707/736 |
| 2013/0097166 A1* | 4/2013 | Fink | G06Q 30/02 707/737 |
| 2013/0144605 A1* | 6/2013 | Brager | G06F 17/28 704/9 |
| 2013/0227402 A1* | 8/2013 | Rossen-Knill | G06F 17/24 715/255 |
| 2014/0024008 A1* | 1/2014 | Sathy | G09B 7/00 434/362 |
| 2014/0229486 A1* | 8/2014 | Kveton | G06F 17/30731 707/737 |
| 2014/0315180 A1* | 10/2014 | Bruce | G06F 1/30731 707/737 |
| 2014/0358926 A1* | 12/2014 | McGregor | G16H 10/60 707/737 |
| 2014/0370485 A1* | 12/2014 | Deane | G09B 7/02 434/353 |
| 2015/0010893 A1* | 1/2015 | Ritter | G09B 7/08 434/350 |
| 2015/0112766 A1* | 4/2015 | Barney | G06Q 30/0203 705/7.32 |

* cited by examiner

METHODS AND SYSTEMS FOR TEXTUAL ANALYSIS

BACKGROUND OF THE INVENTION

I. Field of the Invention

The present invention relates to methods and systems for analyzing text. More specifically, but not exclusively, the present invention relates to computer-implemented methods and systems for textual analysis by generating models of the progression of writing and writing abilities.

II. Description of the Prior Art

Most automated analysis of text in the context of summative assessment is aimed at either 1) establishing measures of the complexity of texts presented to test-takers for the purposes of evaluating reading comprehension, or 2) evaluating writing responses for the purpose of generating a qualitative score.

Therefore, it is an object, feature, or advantage of the present invention to provide models generated to better identify and understand the features and progress of test-taker writing in order to refine test development, improve the validity and predictive value of assessments, and identify areas and strategies for instructional improvement and intervention.

Systems for automated test-grading produce scores on, for example, a scale from 1 to 6 where "6" represents the best score for a specific group of essays. For example, it's not clear how a $5^{th}$ grader receiving a "6" and a $12^{th}$ grader receiving a "6" can be compared. Systems designed to evaluate textual complexity tend to evaluate multiple features of writing and combine these values in unspecified ways into a single score. This single score doesn't tell why a text scored as it did.

Therefore, another object, feature, or advantage of the present invention is to provide models that compare changes both within and between grades, such as by showing change over time and variance within grades.

Another object, feature, or advantage of the present invention is to provide composite data profiles or models of writing.

One or more of these and/or other objects, features or advantages of the present invention will become apparent from the specification and claims that follow.

SUMMARY OF THE INVENTION

The present invention provides computer-implemented methods and systems for textual analysis by generating models of the progression of writing abilities.

One exemplary embodiment provides one or more quality-neutral, data-based profiles of writing characteristics generated from a set of textual data points extracted from an examinee-generated response to one or more test items. The one or more quality-neutral data-based profiles may be correlated with one or more qualitative evaluations. An analysis of one or more relationships between the correlated profiles is provided for the one or more qualitative evaluations.

Another embodiment identifies a set of examinee-generated responses for one or more test items based upon at least one index. One or more data-based profiles may be assembled from the identified set of examinee-generated responses. One or more writing characteristics from the assembled one or more data-based profiles may be quantified based on the at least one index.

Yet another embodiment provides one or more quantitative measures aggregated from a set of examinee-generated responses for one or more test items. One or more composite data profiles of writing may be constructed from the aggregated one or more quantitative measures. The one or more composite data profiles of writing may be correlated with one or more qualitative evaluations. Also, the one or more relationships between the one or more composite data profiles of writing and the one or more qualitative evaluations may be analyzed.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE PREFERRED EMBODIMENTS

Aspect of the present disclosure, for example, establish systems and methods for generating models of writing abilities and models of progression of writing abilities. In general, the methods and systems may be configured to include, for example, 1) automated mining of quantifiable textual components of writing responses to generate quality-neutral data-based profiles of writing characteristics; 2) correlation of the quality-neutral data-based profiles with qualitative evaluations; and 3) analysis of relationships among the correlated profiles within and across assessments, grade levels, proficiencies, demographics, etc. One or more models or maps generated by a method or system of the present disclosure can be used to better identify and understand the features and progress of test-taker writing in order to refine test development, improve the validity and predictive value of assessments, and identify areas and strategies for instructional improvement and intervention. What follows are exemplary aspects for implementation of one or more of the systems or methods of the present disclosure.

Figure 1:
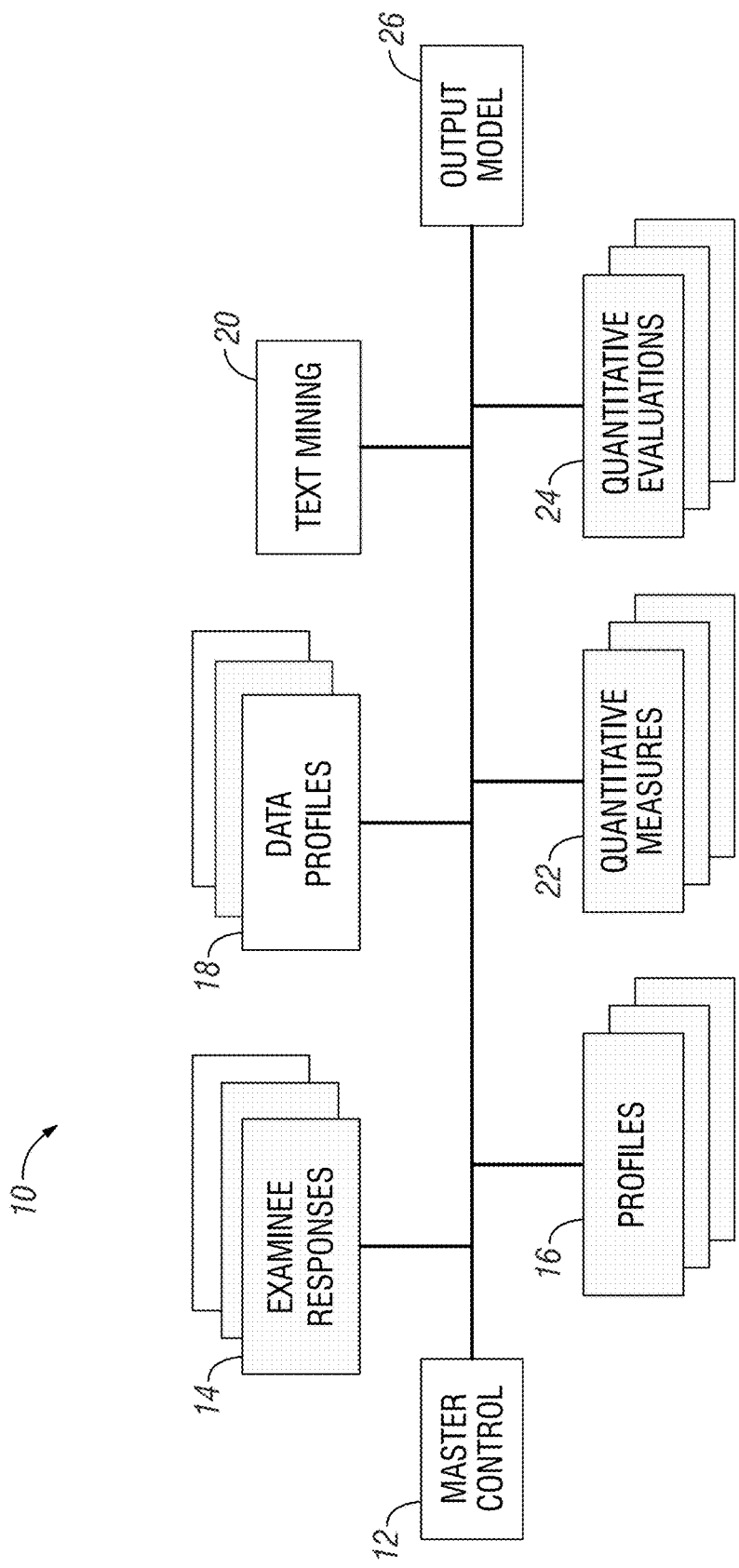
FIG. 1 is a pictorial representation of a block diagram in accordance with an illustrative embodiment.

FIG. 1 is a pictorial representation of a block diagram for a method and system 10 of the present disclosure. A set of processes, operations and/or functions are illustrated pictorially. These may include, for example, operating independently or dependently a master control 12 providing an output model 26. The master control 12 shown also in FIG. 14 may be configured to process, operate or functionalize the other elements of the system 10, including, data profiles 18, examinee responses 14, text mining 20, quantitative measures 22, and qualitative evaluations 24. The examinee responses 14 to test items provide data that upon inspection can be used to identify features of the writing in the examinee responses 14 that are useful for showing the progression of examinee writing, student writing or writing in general. To acquire metrics or a set of metrics from examinee responses 14, a text mining process, function or operation 20 is used.

Figure 2:
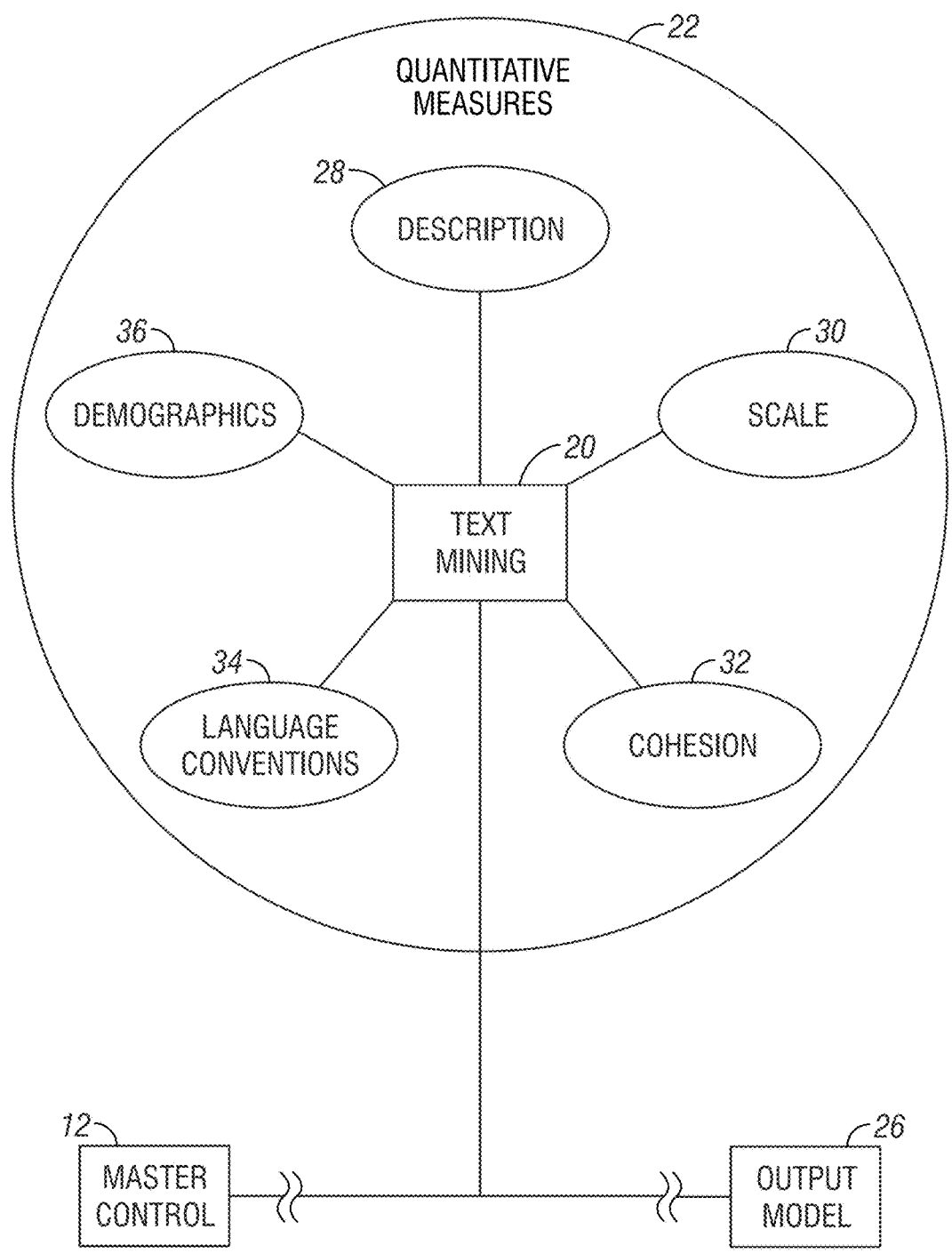
FIG. 2 is a pictorial representation of a portion of the block diagram shown in FIG. 1 in accordance with an illustrative embodiment.
Figure 3:
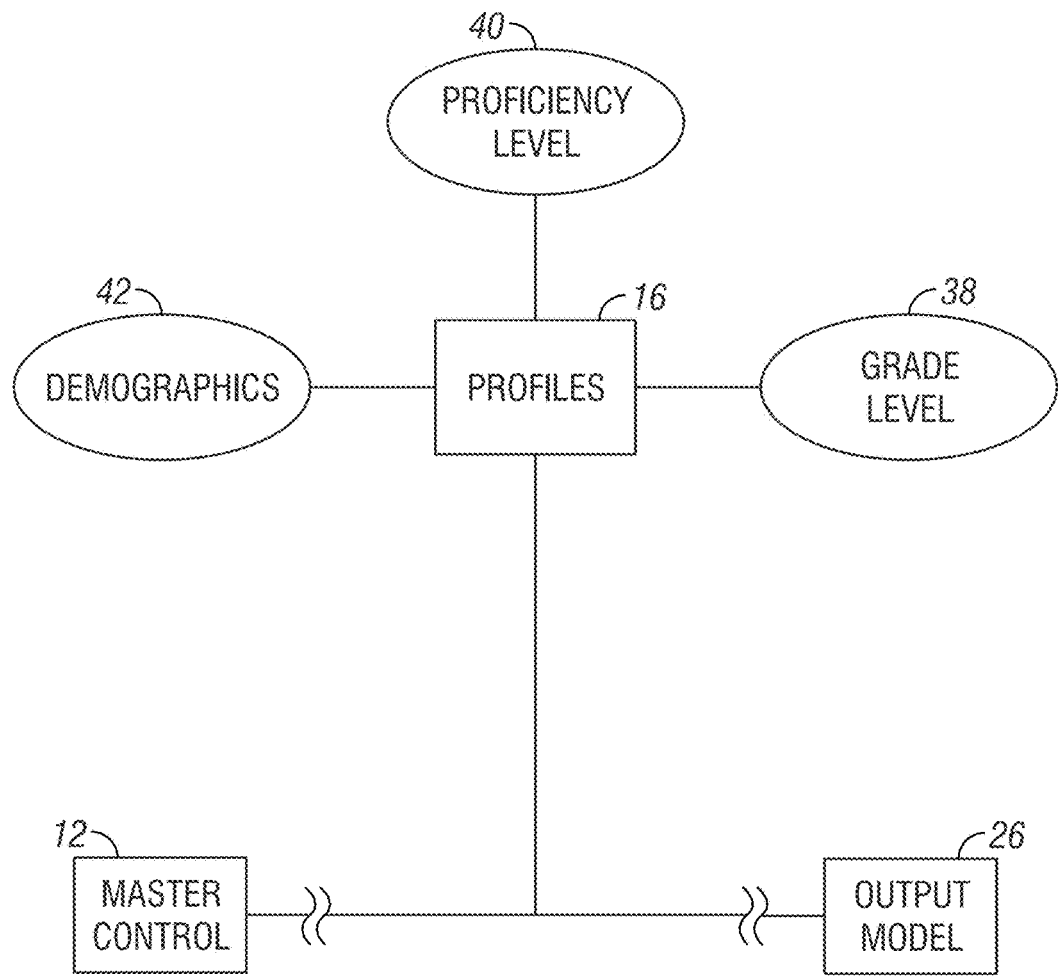
FIG. 3 is a pictorial representation of another portion of the block diagram shown in FIG. 1 in accordance with an illustrative embodiment.

FIG. 2 provides a pictorial representation of the text mining 20 portion of the block diagram in accordance with an illustrative embodiment of FIG. 1. Text mining 20 may be accomplished, for example, using automated analysis whereby through a text mining process the system 10 aggregates quantitative measures 22 from examinee responses 14. Text mining 20 is implemented to identify in one or more examinee responses 14 quantifiable textual components, measures, features, indices, etc. Most automated analysis of text such as examinee responses 14 in the context of summative assessment is aimed at either 1) establishing measures of the complexity of texts presented to test-takers for the purpose of evaluating reading comprehension, or 2) evaluating writing responses for the purpose of generating a qualitative score. Methods and systems of the present disclosure apply automated textual analysis (i.e., text mining) in such a way that it analyzes examinee responses 14 in order to generate quality-neutral data-based profiles. However different, the methods and systems of the present disclosure are not aimed at automated scoring, nor at generating a complexity score for reading assessment stimuli, rather methods and systems of the present disclosure are configured to generate composite data profiles of writing within and across assessments in order to construct models 26 of writing abilities. For example, examinee responses 14 may be analyzed using an automated linguistic computational tool, such as a commercially available tool. For example, Coh-Metrix® provides an automated linguistic computation tool of the genre contemplated herein. Of course, there are other automated linguistic computation tools available that can be used for text mining 20 examinee responses 14. Alternatively, open-source code and/or in-house tools could be used to provide an automated linguistic computation tool. Purposefully, text mining 20 of examinee responses 14 is for identifying whichever quantitative measures 22 are most telling and useful that may be aggregated from examinee responses 14 analyzed in accordance with a certain index, such as for a given grade or for a given assessment. Batches of examinee responses 14 will be a sufficient number to generate an aggregate representative profile of the writing of students in accordance with a preferred index, such as at a given grade level, produced in response to one or more test items or assessments. A profile, for example, at each grade or for a given assessment may consist of the composite of the aggregated data produced by a linguistics computational tool for text mining 20 for a specific grade or for a specific assessment. Thus, according to one aspect, output model 26 may be constructed by correlating data profiles with qualitative evaluations as addressed further below. Linguistic computational tools for text mining 20 one or more quantitative measures 22 from examinee responses 14 produce indices of linguistic and discourse representations of a text. Various linguistic computational tools are capable of mining various indices from examinee responses 14. Thus, it is presumed that one or more commercially available or other traditional linguistic computational tools may be used to identify features of text, such as from examinee responses 14, to achieve one or more purposes of the methods and systems of the present disclosure. By way of example, but not limited to the general categories set forth in FIG. 2, are a few indices that may be used for generating output model 26 in accordance with at least one aspect of the present disclosure. Represented pictorially are but a few of the indices or general categories that may be used for collecting or mining data from examinee responses in accordance with at least one text mining 20 process, operation or function of the present disclosure. Categories of consideration include, for example, description 28, scale 30, cohesion 32, language conventions 34, and demographics 36. As previously indicated, other quantitative measures 22 may be included as indices of the linguistic and discourse representations of examining responses 14. The description 28 category (i.e., descriptiveness) may look at parameters such as paragraph length and count, sentence length and count, word length and count, a count of nouns, verbs, adjectives, adverbs, pronouns, word frequency, and other descriptive elements. The scale 30 category may include looking at simplicity/complexity measures, including measuring quality such as narrativity, word correctness, connectivity, syntactic complexity, syntactic pattern density, and readability. Other quantitative elements are contemplated. The cohesion 32 category may include inspection of measures such as cohesion, including referential cohesion, latent semantic relationships, casual cohesion, and lexical diversity. Other cohesion 32 elements are contemplated. Language conventions 34 may include, for example, grammatical errors, word usage, mechanics, and style. The demographics 36 category may include, for example, test-taker socio-economic status, race, sex, grades/assessment scores (e.g., Aspire, the ACT or COMPASS), age, etc. Other demographic 36 elements are contemplated. Such information may be used in the analysis of one or more profiles, however one or more elements/portions thereof may not always be used as a component of the profiles in accordance with at least one aspect of the present disclosure. Quantitative measures 22 or like text features may be aggregated from responses (e.g., examinee responses 14) generated by an assessment. These may comprise quality-neutral data-based profiles of the characteristics of the writing produced by an assessment test-taker resulting in examinee responses 14. Such profiles 16 as pictorially represented in FIG. 3 may be used in test development and instruction as they reveal patterns and differences that characterize student writing at given grades (i.e., grade level 38), assessment levels (i.e., proficiency level 40), or demographics 42. When compared one to another, these profiles 16 offer opportunities to identify changes in the characteristics of writing over time, as examinees advance in grade level 38 or otherwise receive increased levels of instruction, proficiency 40 or practice. The construction or generation of quality-neutral data-based profiles of writing characteristics represent composite data profiles of writing or aggregate a representative profile of student's writing, for example, at a given grade level 38, proficiency level 40 and/or demographic 42. In other words, the quality-neutral data-based profile comprises a composite of aggregated data produced by a computational tool for a specific grade level 38 and/or proficiency level in combination with, at least optionally, one or more demographics 42.

Figure 4:
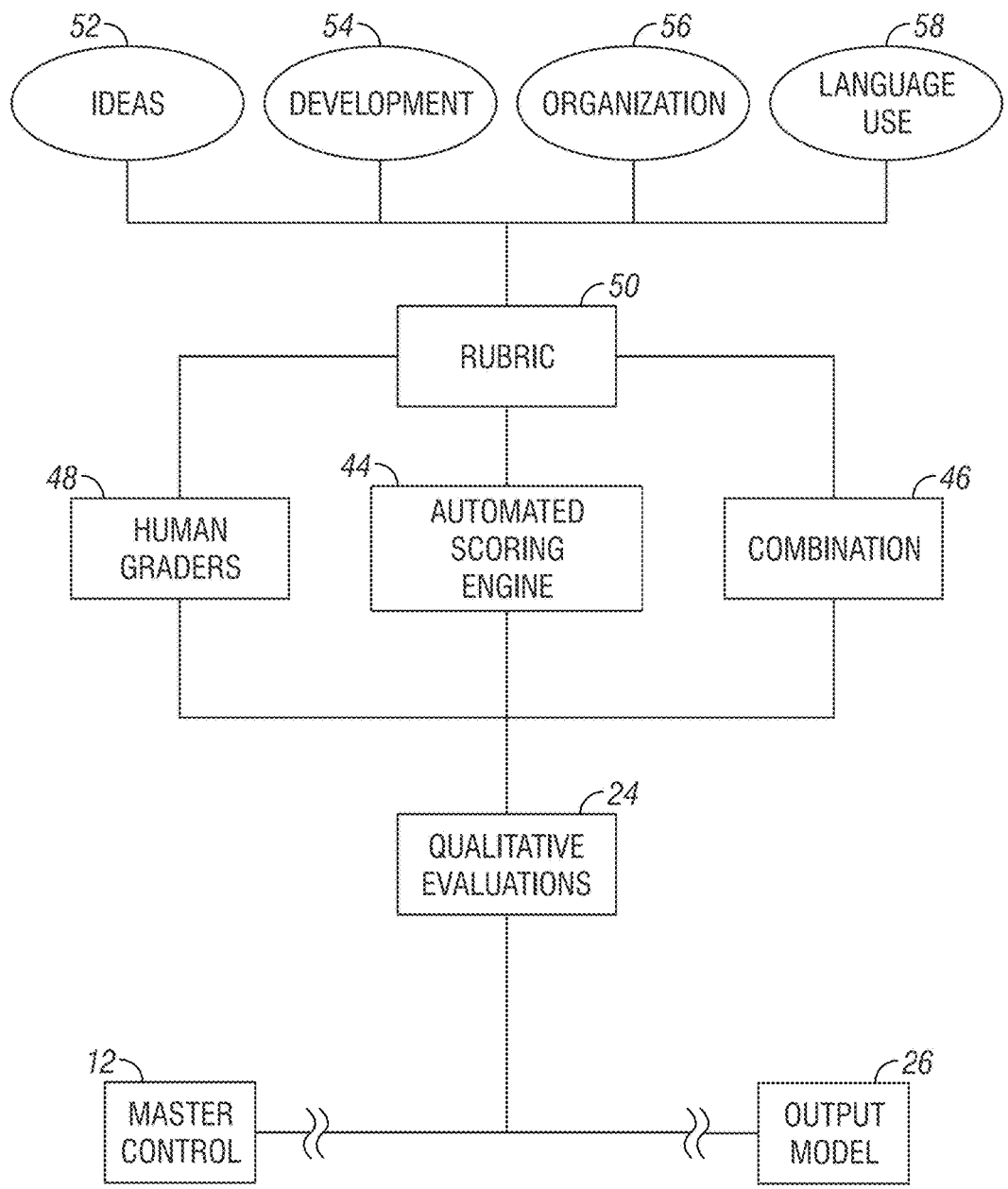
FIG. 4 is a pictorial representation of still another portion of the block diagram shown in FIG. 1 in accordance with an illustrative embodiment.

FIG. 4 provides a pictorial representation of another portion of the block diagram shown in FIG. 1 in accordance with an illustrative embodiment. Another process, operation and/or function of the present disclosure is to correlate/align profiles 16 of writing characteristics with qualitative evaluations 24 (i.e., align data-based portraits of writing with qualitative evaluations 24). Generally, examinee responses 14 to writing assessments are rated by human graders 48, by automated scoring engines 44, or a combination 46 of the two. Whichever the case, examinee responses 14 are generally evaluated according to a rubric 50. Rubric 50, for example, is based on writing competency models, tailored to each grade-level writing assessment. Rubric 50 may be defined as an analytical rubric with four domains generally corresponding to the quality of ideas 52, development 54, organization 56, and language use 58. The rubric 50 may include, for example, for grades 3 through 5 a score in each pictorially illustrated domain 52, 54, 56 and 58 from 1 to 5. In all other grades/levels, for example, the rubric 50 may allow for scores of 1-6 in each of the four pictorially illustrated domains 52, 54, 56 and 58. By applying the rubric to examinee writings 14, evaluations of quality of the examinee writings 14 are arrived at. This may be accomplished, for example, by taking a new operational writing prompt from an examinee response 14, conducting an extensive range finding process with expert raters, assembly, training, and qualification sets, including training human raters to score the examinee responses 14. In some cases, human raters may score all of the assessment responses, and in other cases some number of examinee responses are scored with at least two human-generated scores which are used to train an automated scoring engine, such as those previously discussed. Scoring may be monitored throughout and according to quality control measures such as score distribution, inter-rater reliability, mean scores, and standard deviation. The resulting composite data profiles 16 provide an opportunity to align data-based portraits of writing with qualitative evaluations 24. The alignment produces fine-grain models 26 of writing within and across assessments, such as models 26 that describe the key characteristics of writing that appear at different levels of proficiency and at different grades or levels of assessment. For example, a composite data profile at six levels of proficiency for writing among a grade may be derived and differences mapped accordingly.

Figure 5:
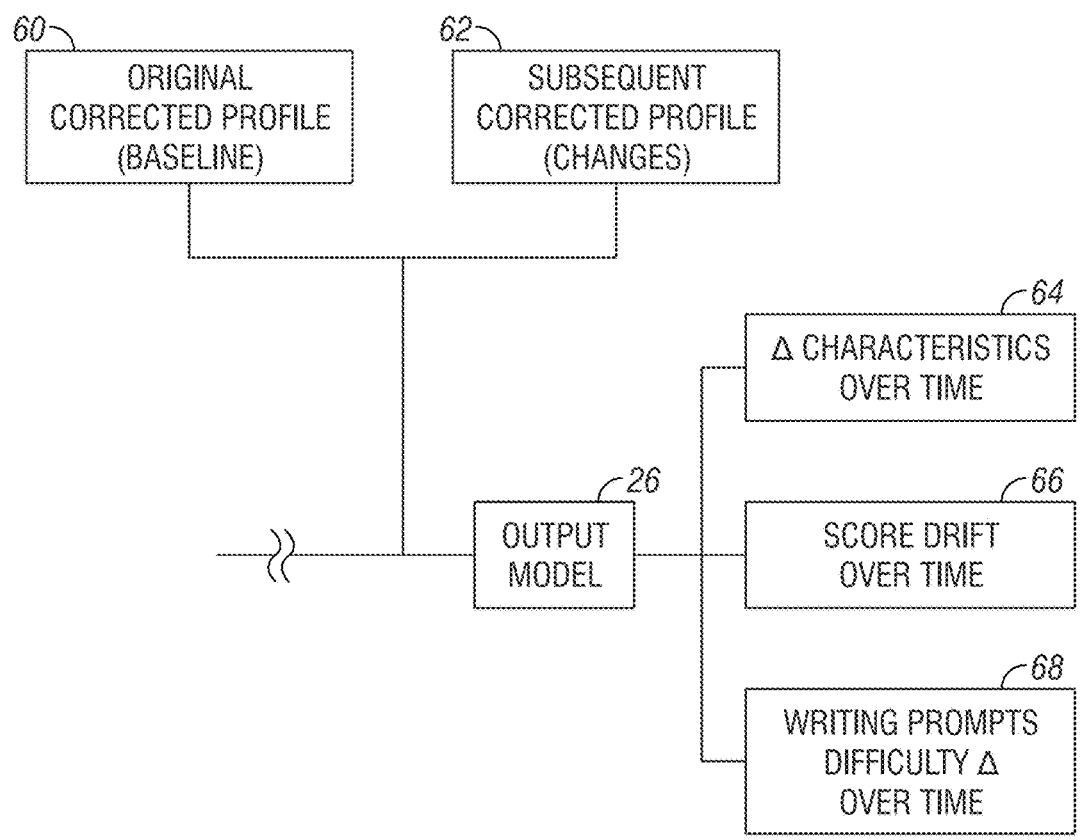
FIG. 5 is a pictorial representation of yet another portion of the block diagram shown in FIG. 1 in accordance with an illustrative embodiment.

In one aspect of the present disclosure as pictorially represented in FIG. 5, the differences may be mapped as originally correlated profile (baseline) 60 form a baseline against which changes (i.e., subsequent correlated profiles 62) can be observed over time and across grades or assessment levels. The models of each grade writing in the years after (e.g., subsequent correlated profile (changes) 62), when compared to the baseline (e.g., original correlated profile (baseline) 60). Models for a grade might comprise indications of a) whether or not the characteristics of a grade writing are changing over time 64; or b) whether or not scoring is drifting over time 66; c) whether or not the difficulty of writing prompts is changing over time 68.

What follows is an experimental description in accordance with one or more analyses of methods and systems of the present disclosure. Correlated profiles 60 and 62 provide an opportunity to understand the development of writing proficiency. For example, the output model 26 may be configured to associate writing at each rubric-defined proficiency level with a constellation of empirically observed text characteristics. According to one aspect of the present disclosure, the data within a specific grade-level profile may be differentiated according to the qualitative scores using a data analysis tool such as Tableau®. That is, the data comprising the profile 16 can be grouped according to the qualitative scores 24 received by the examinee responses 14 contributing to the profile 16. This may be accomplished, for example, by entering scores as a variable into the profile data and then sorting accordingly. Data profiles correlated with qualitative scores form models 26 of writing. A model functions by showing the quantified textual characteristics of writing at a given grade and proficiency level. When models 26 are compared, they show differences in the textual characteristics of writing at different proficiency levels and grades. Output model 26 can be used to search for correlation among variables using, for example, linear discriminant analysis. By grouping the profile data according to an assigned qualitative score, methods and systems of the present disclosure are able to associate writing at each rubric-defined proficiency level with the constellation of empirical observed text characteristics. For example, identifying all of the fifth-grade student responses that received a qualitative score of 4 in the first rubric domain, assembling the profile data associated with these responses, and thus identifying the quantified text characteristics associated with fifth-grade essays receiving a score of four in a first domain. Data analysis might reveal, for example, that proficient writers in a grade show a marked increase in their use of abstract words compared with a lower grade. The output model 26 generated by the methods and systems of the present disclosure can be used to better identify and understand the features and progress of examinee responses 14 in and between grades and proficiency levels in order to refine test development and prove the validity and predictive value of assessments, and identify areas and strategies for instructional improvement and intervention. As illustrated pictorially in FIG. 3, demographic 42 information may be included in the analysis. Capturing demographic 42 information associated with examinee responses 14 may further advance the output model 26. Demographic 42 data, entered into a database, allows the systems and methods of the present disclosure to generate additional models of writing by sorting according to a demographic category 42 as well as grade 38 and proficiency level 40. Thus, methods and systems of the present disclosure are able to see how/if the textual features of writing differ among racial groups or between genders at different proficiency levels 40 and grades 38. Methods and systems of the present disclosure also track learning progressions to determine if there are differences in when or what writing abilities are acquired among varying demographics 42. For example, what may be identified, may include 1) what differences in the features in writing are observed across gender, or race, or socio-economic status; and 2) where intervention may be targeted to help particular groups of writers achieve proficiency.

Figure 6:
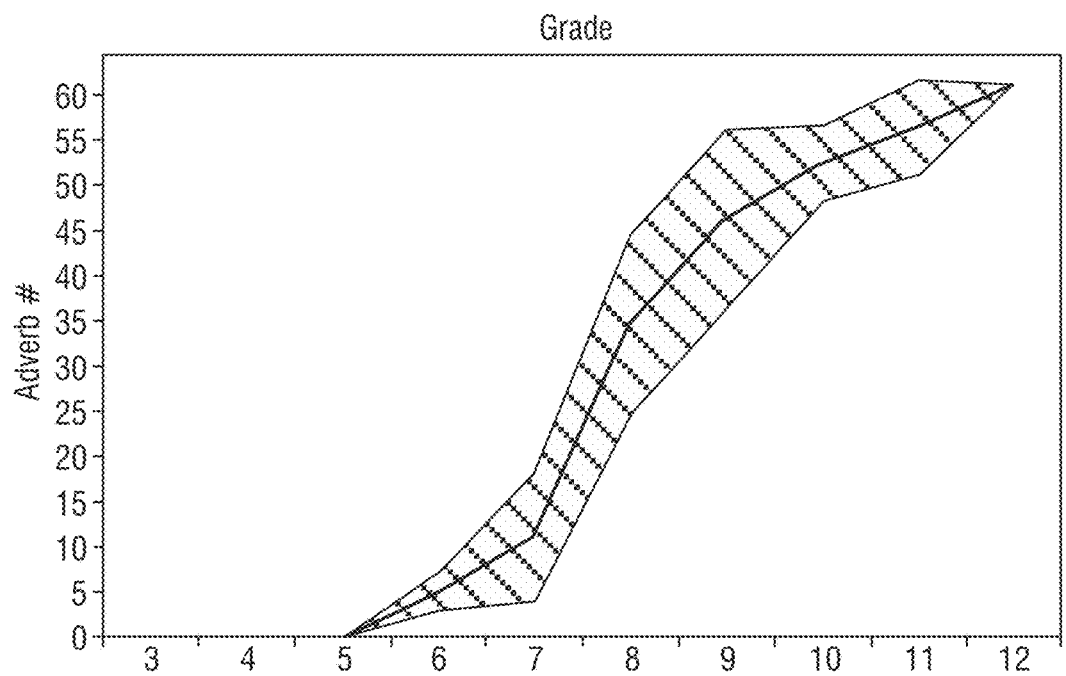
FIG. 6 is a pictorial representation of an adverb plot in accordance with an illustrative embodiment.
Figure 7:
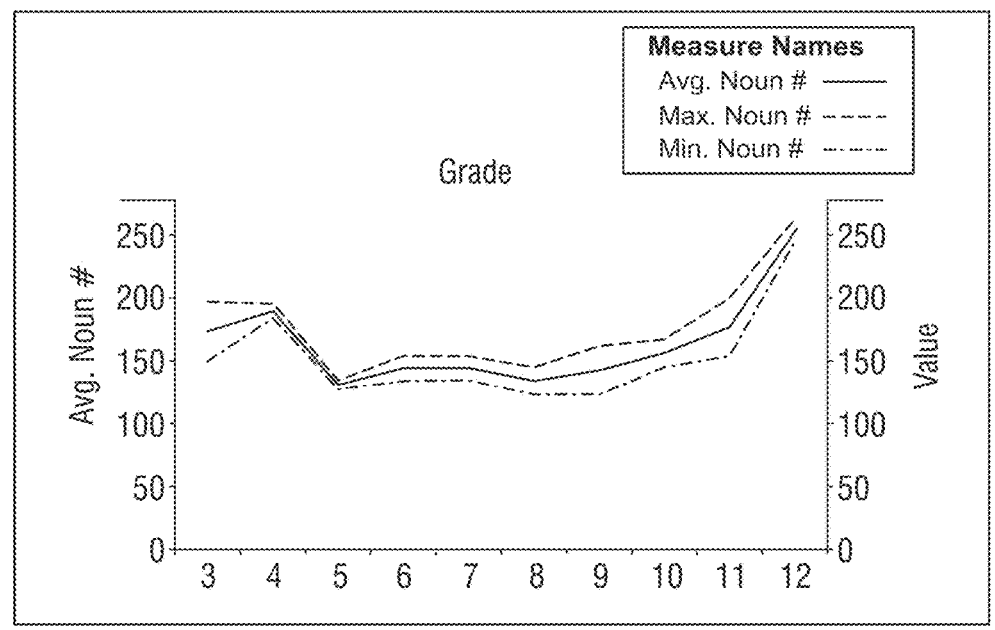
FIG. 7 is a pictorial representation of a noun plot in accordance with an illustrative embodiment.
Figure 8:
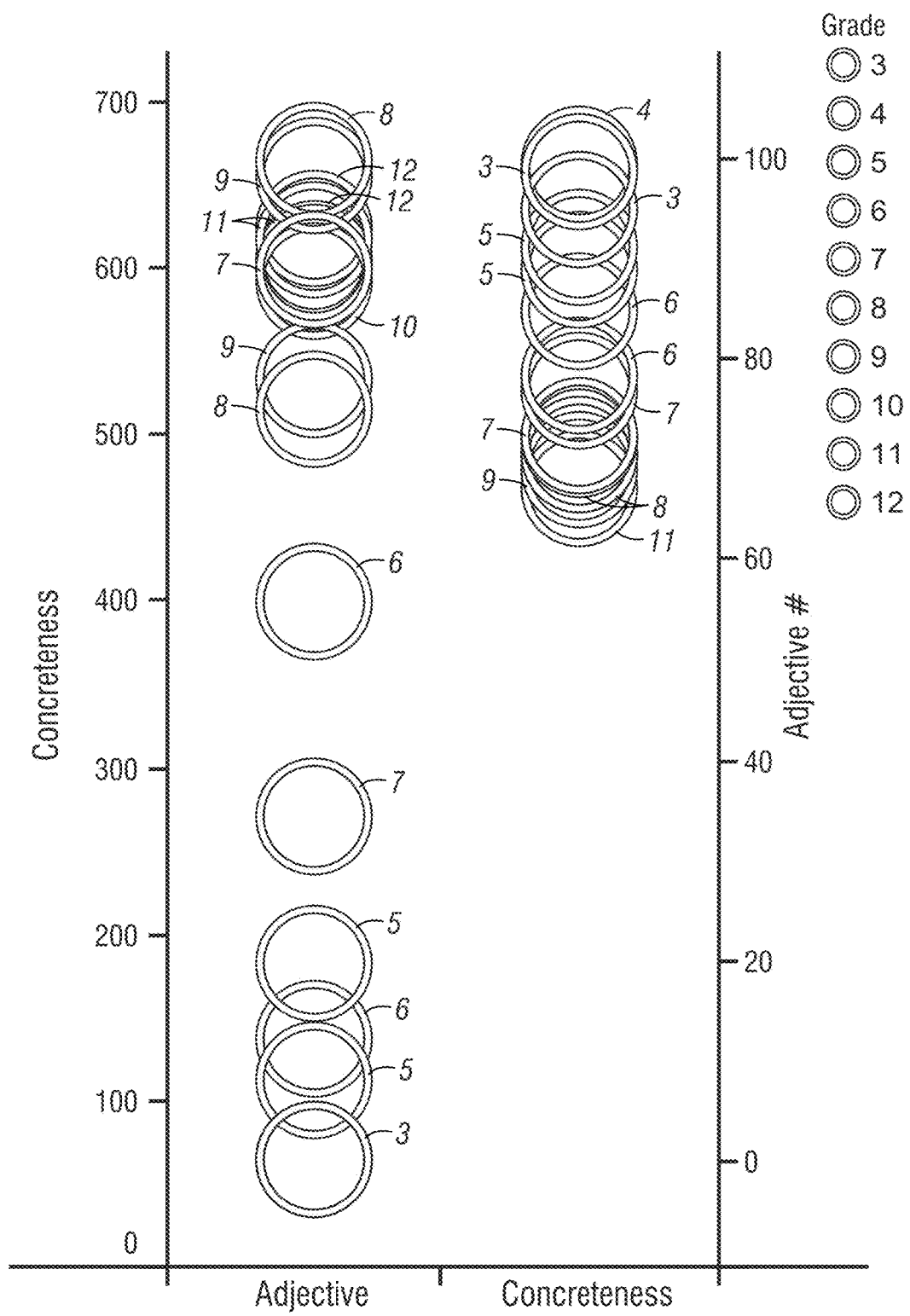
FIG. 8 is a pictorial representation of concreteness and adjective plots in accordance with an illustrative embodiment.
Figure 9:
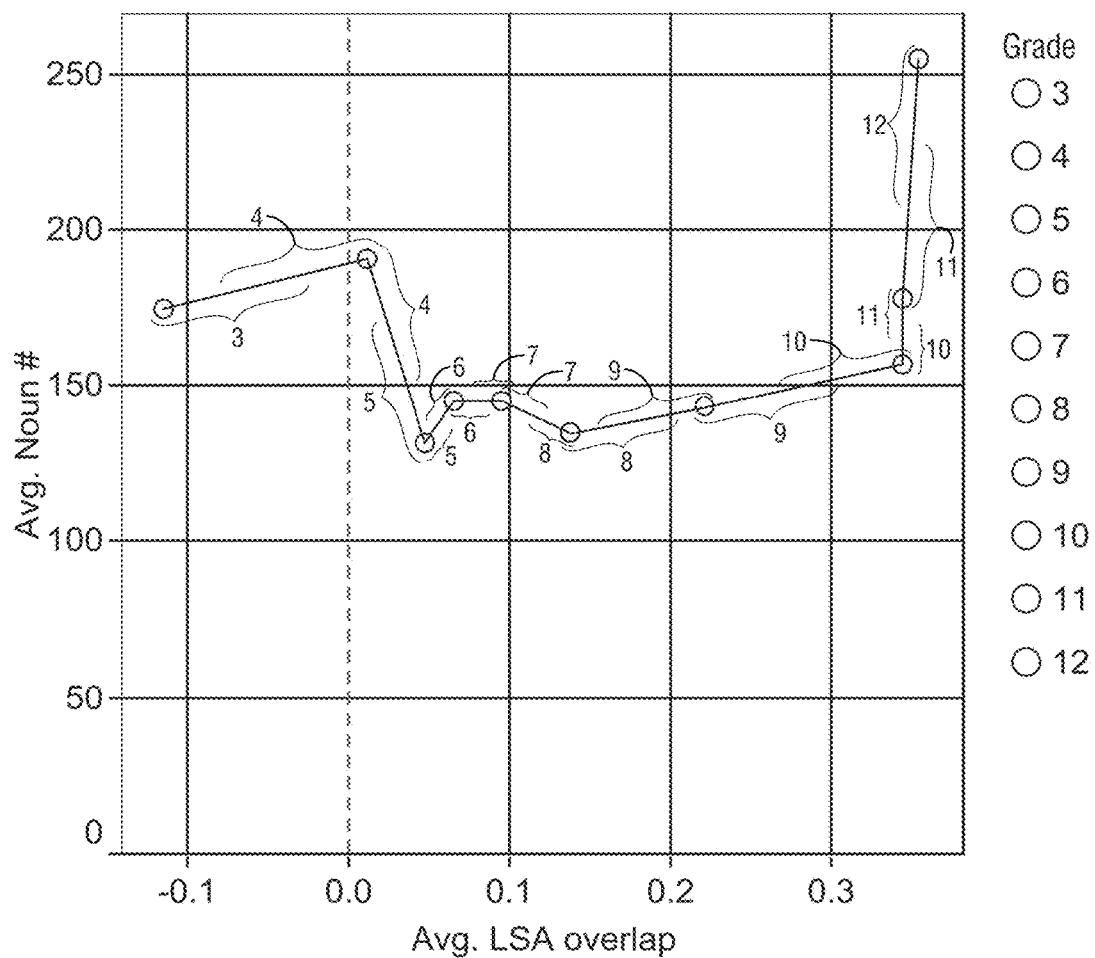
FIG. 9 is a pictorial representation of a noun number plot in accordance with an illustrative embodiment.
Figure 10:
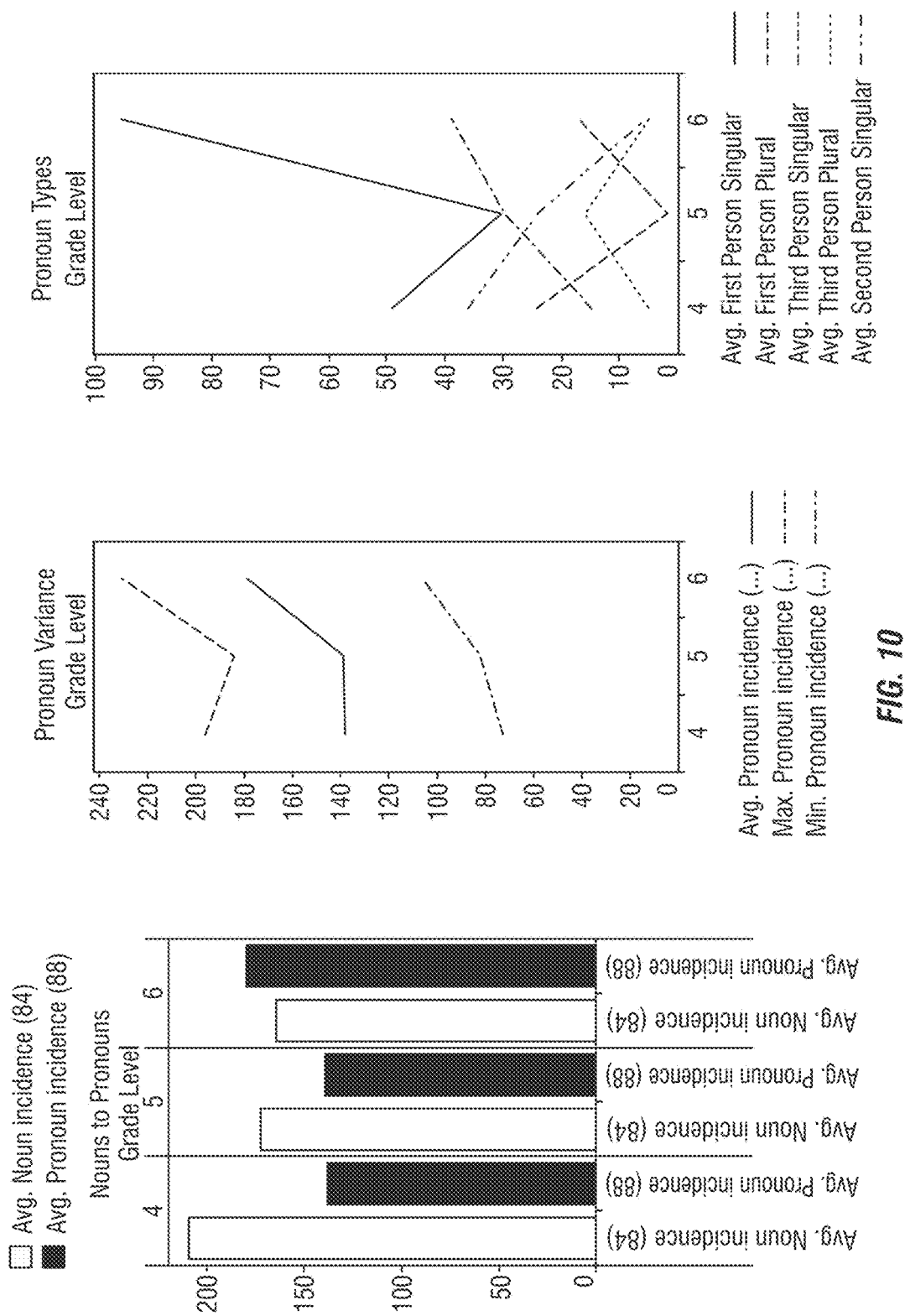
FIG. 10 is a pictorial representation of noun and pronoun plots in accordance with an illustrative embodiment.
Figure 11:
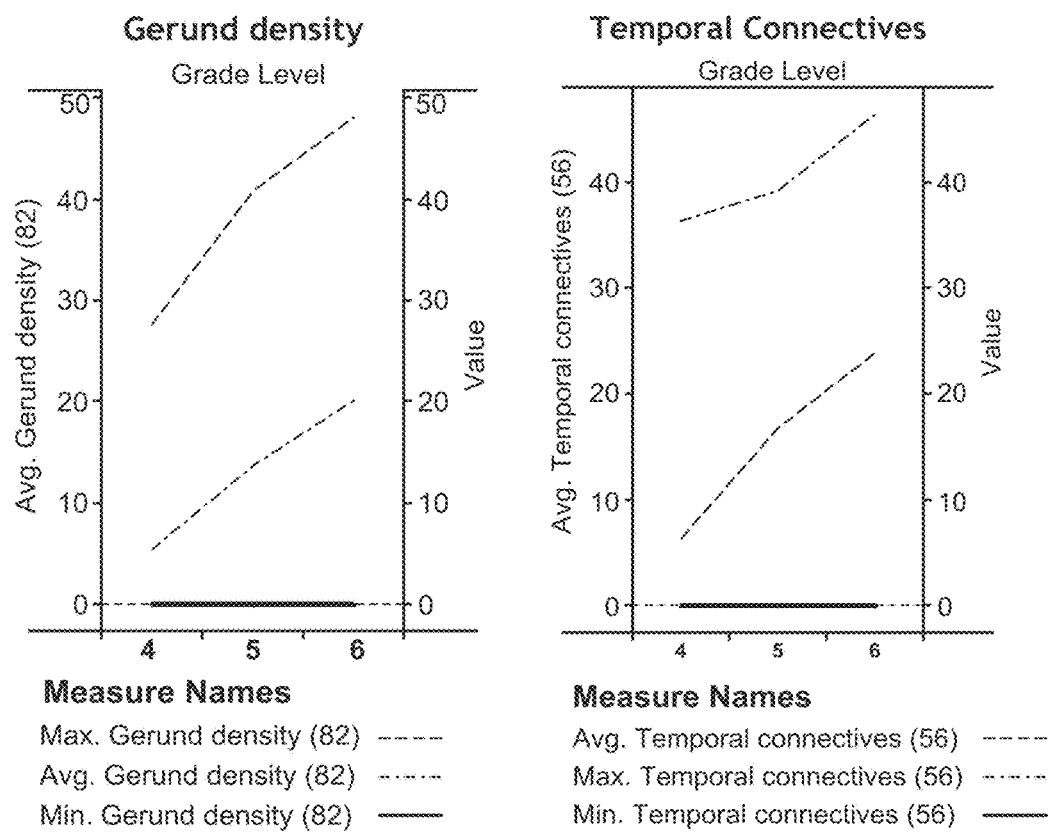
FIG. 11 is a pictorial representation of gerund density and temporal connectives plots in accordance with an illustrative embodiment.
Figure 12:
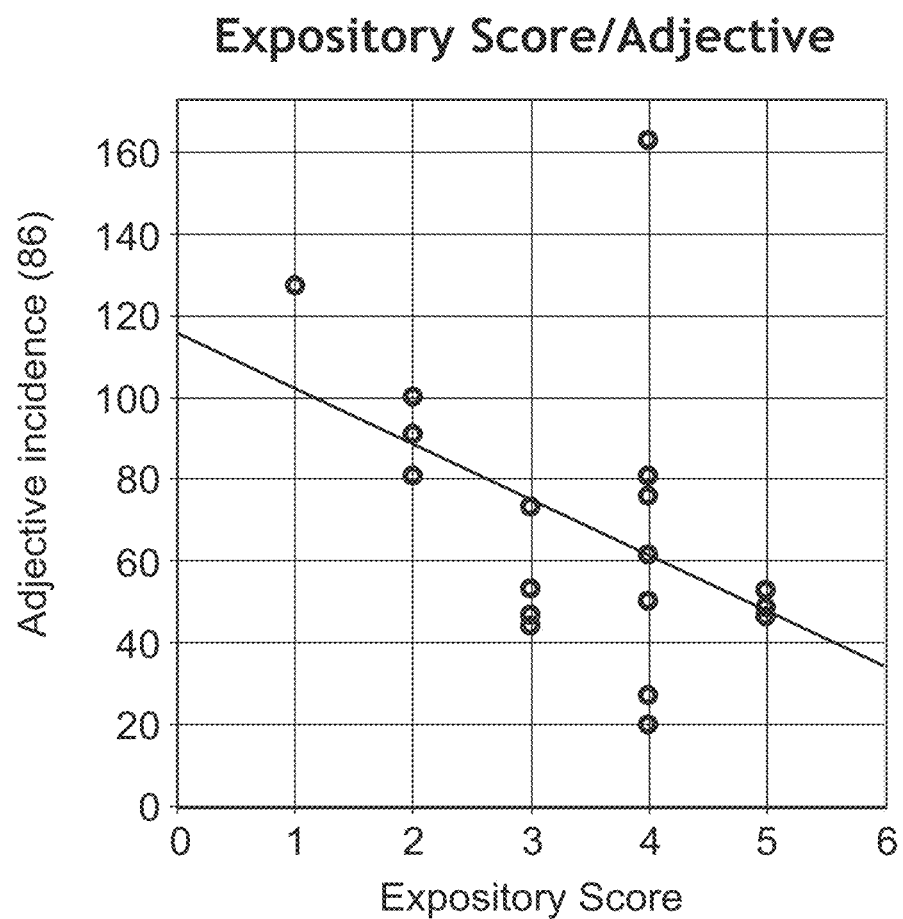
FIG. 12 is a pictorial representation of a expository score plot in accordance with an illustrative embodiment.
Figure 13:
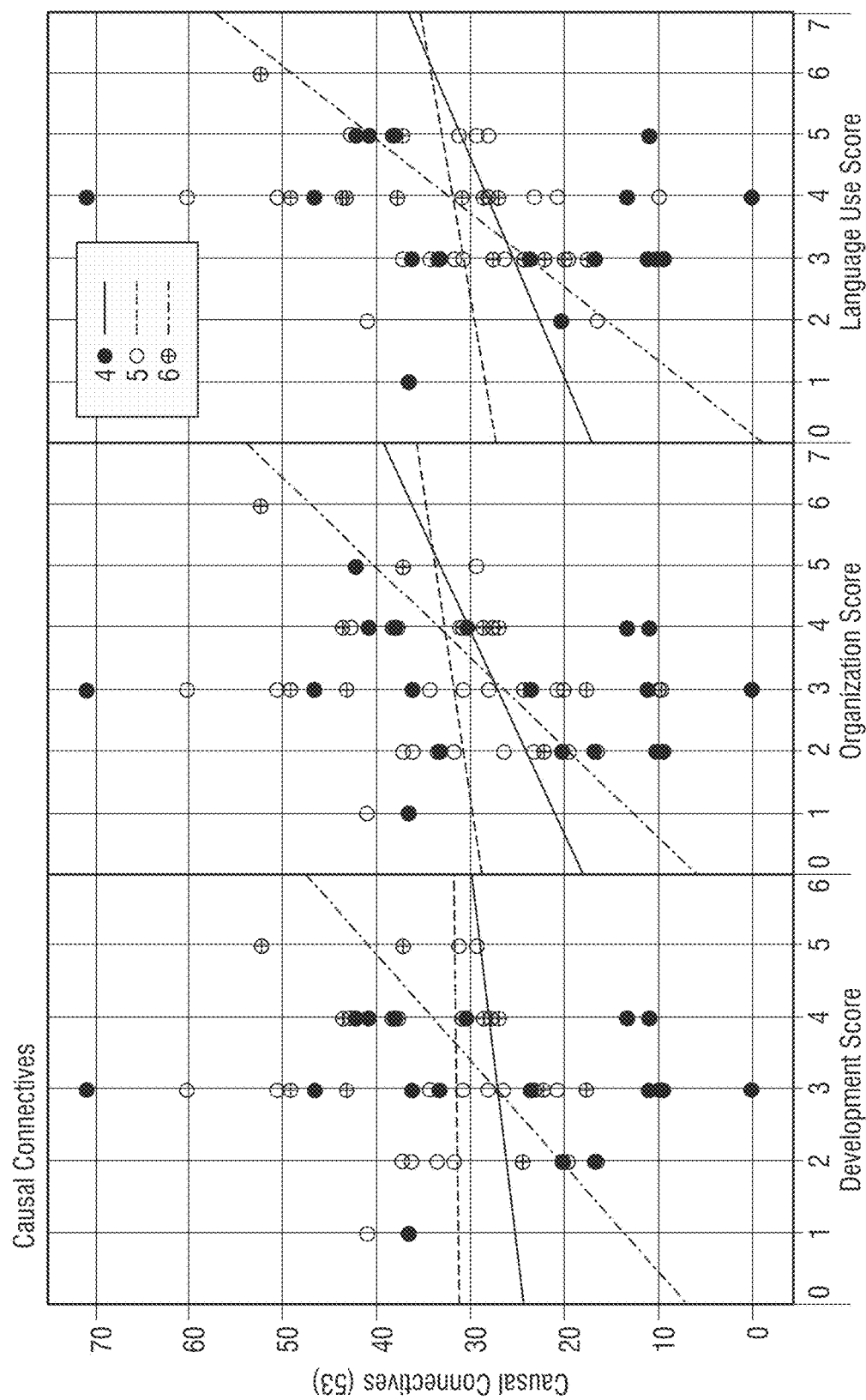
FIG. 13 is a pictorial representation of a causal connectives plot in accordance with an illustrative embodiment.
Figure 14:
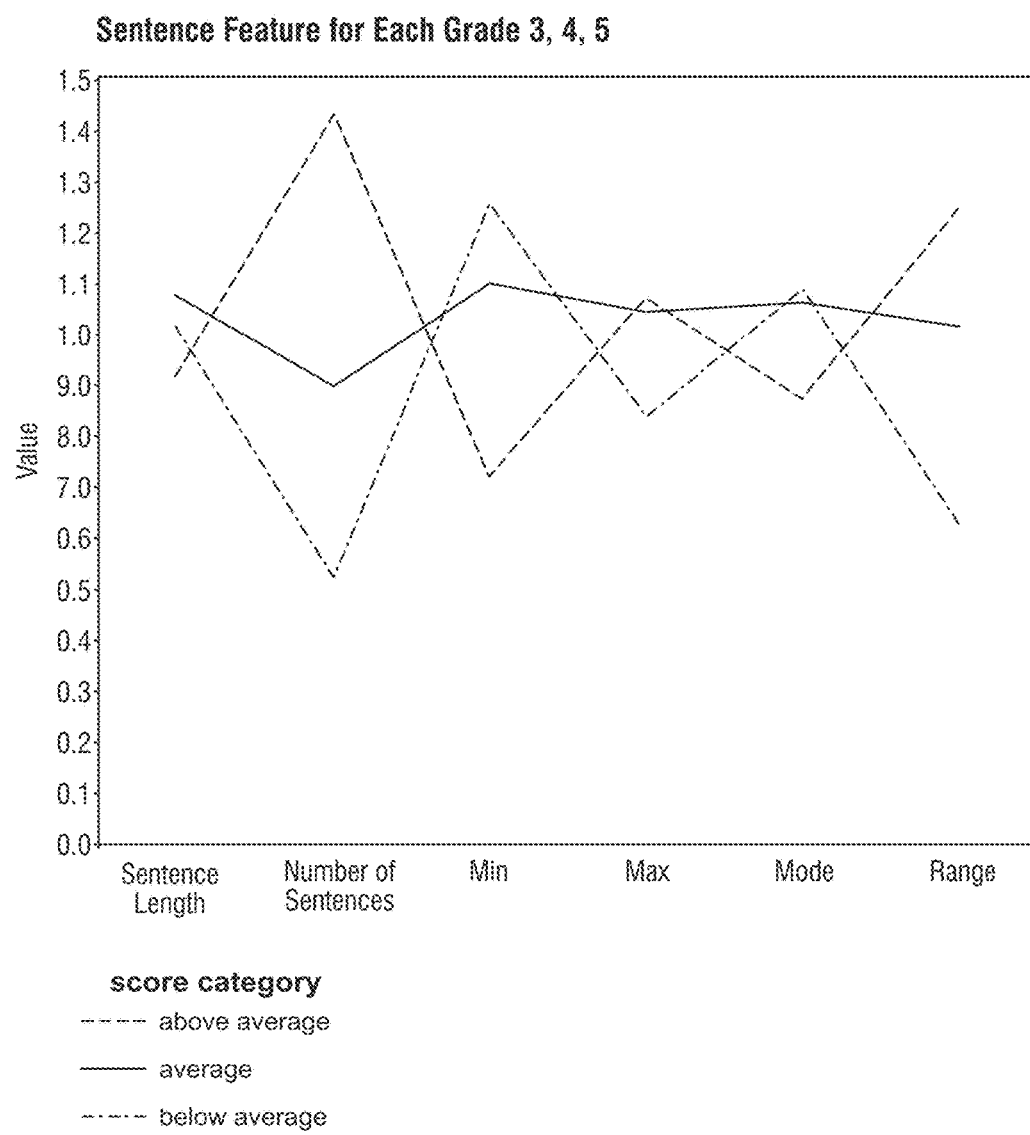
FIG. 14 is a pictorial representation of a sentence feature plot in accordance with an illustrative embodiment.
Figure 15:
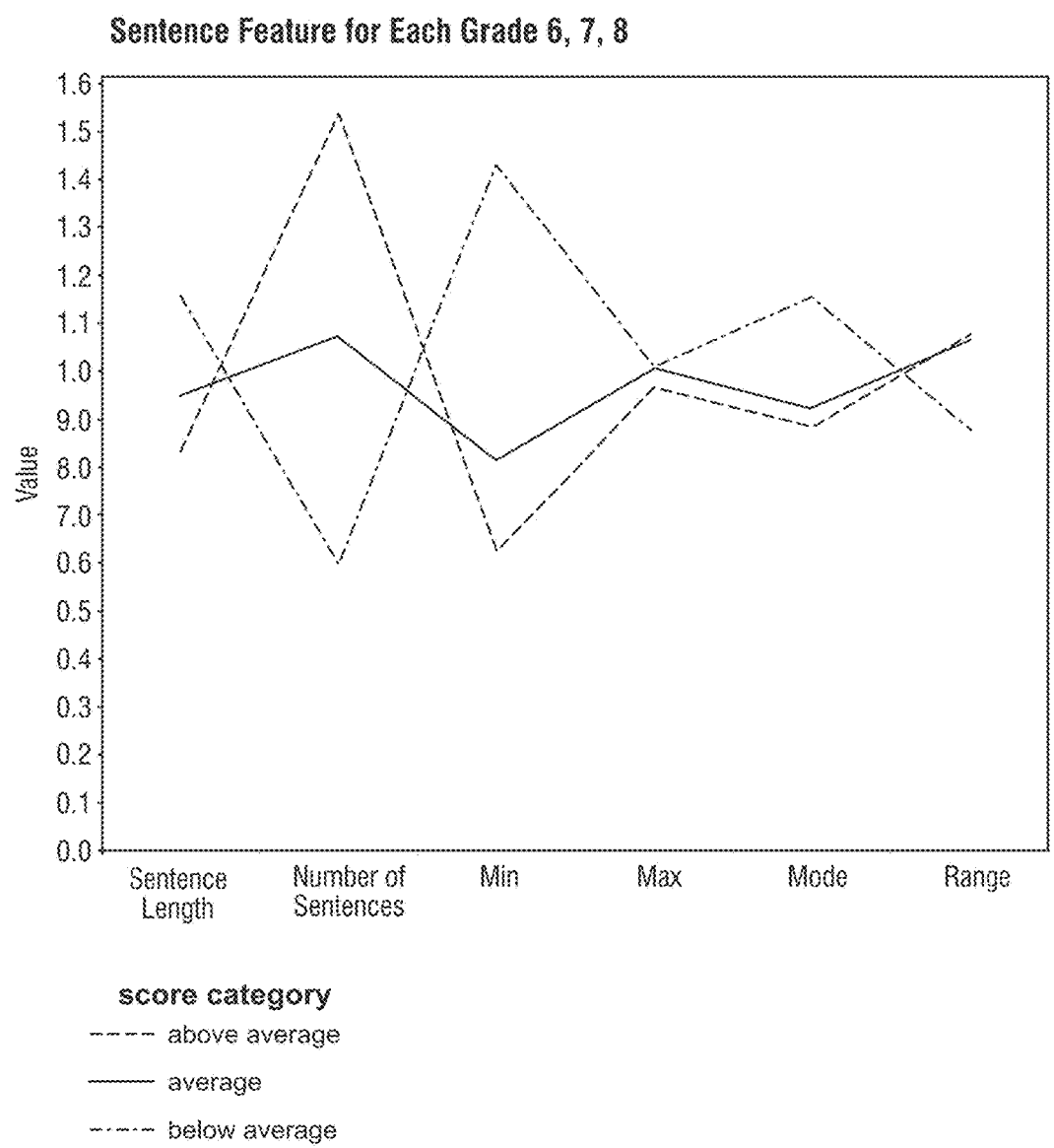
FIG. 15 is a pictorial representation of another sentence feature plot in accordance with an illustrative embodiment.
Figure 16:
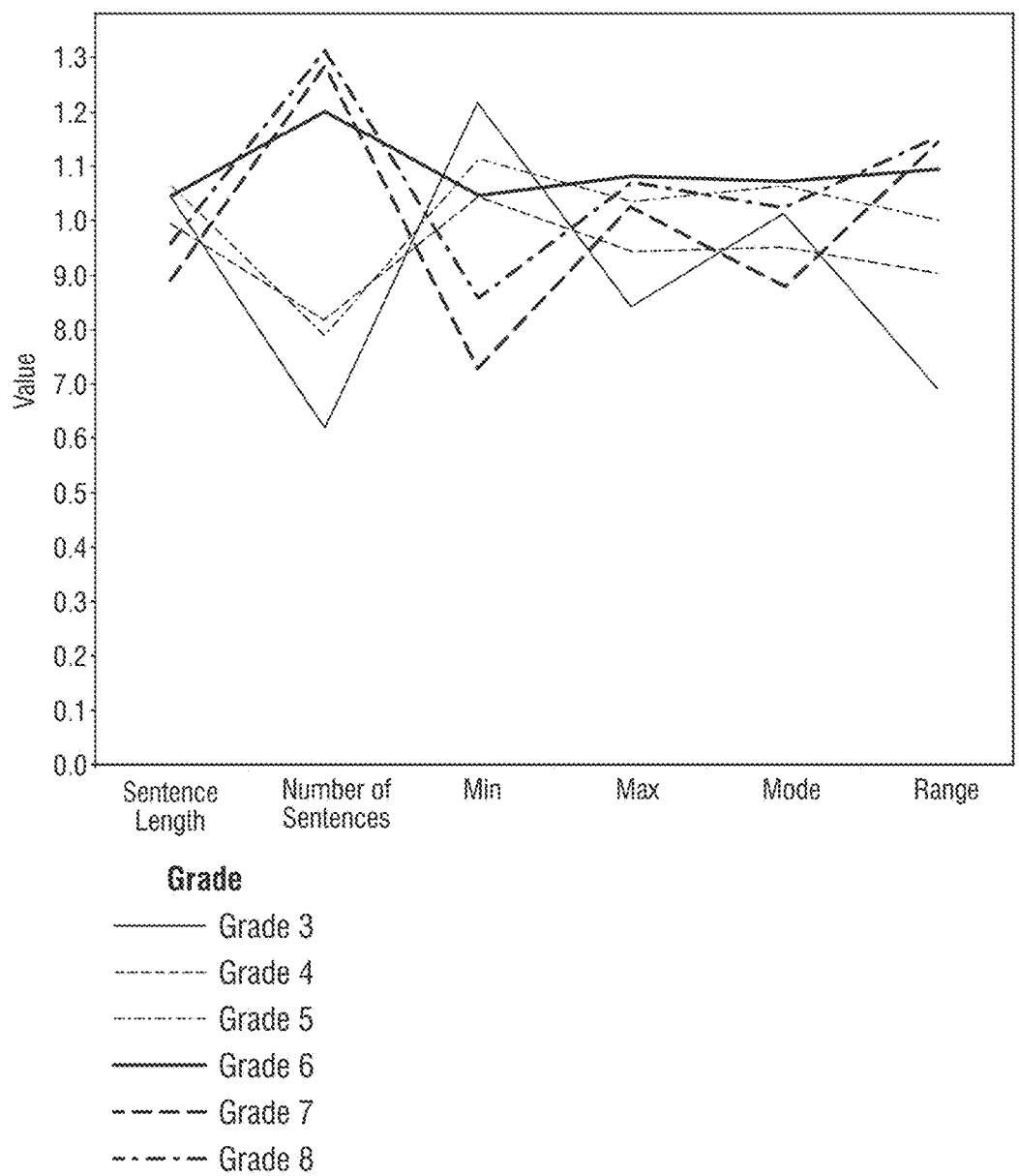
FIG. 16 is a pictorial representation of a yet another sentence feature plot in accordance with an illustrative embodiment.
Figure 17:
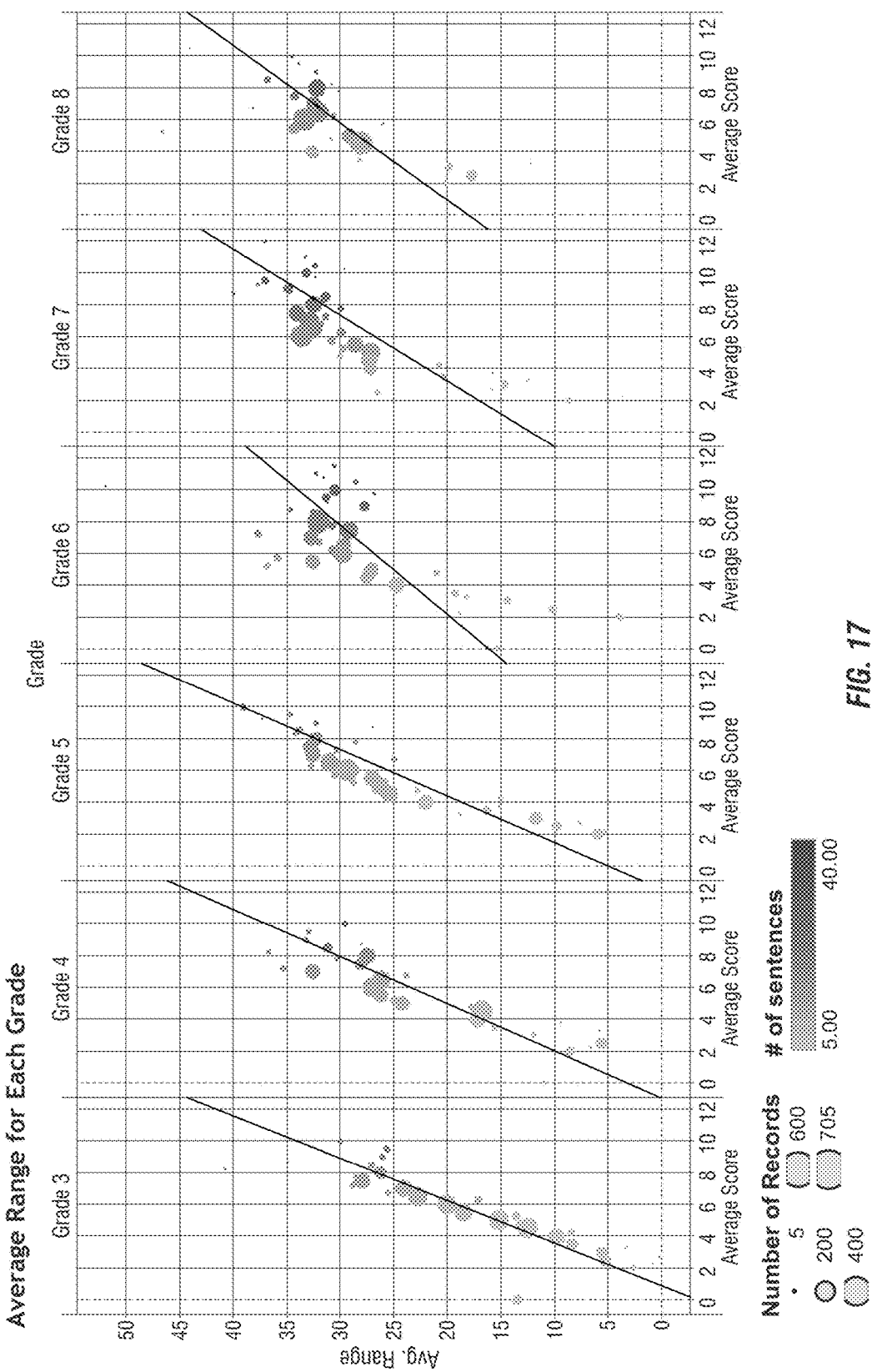
FIG. 17 is a pictorial representation of still another sentence feature plot in accordance with an illustrative embodiment.
Figure 18:
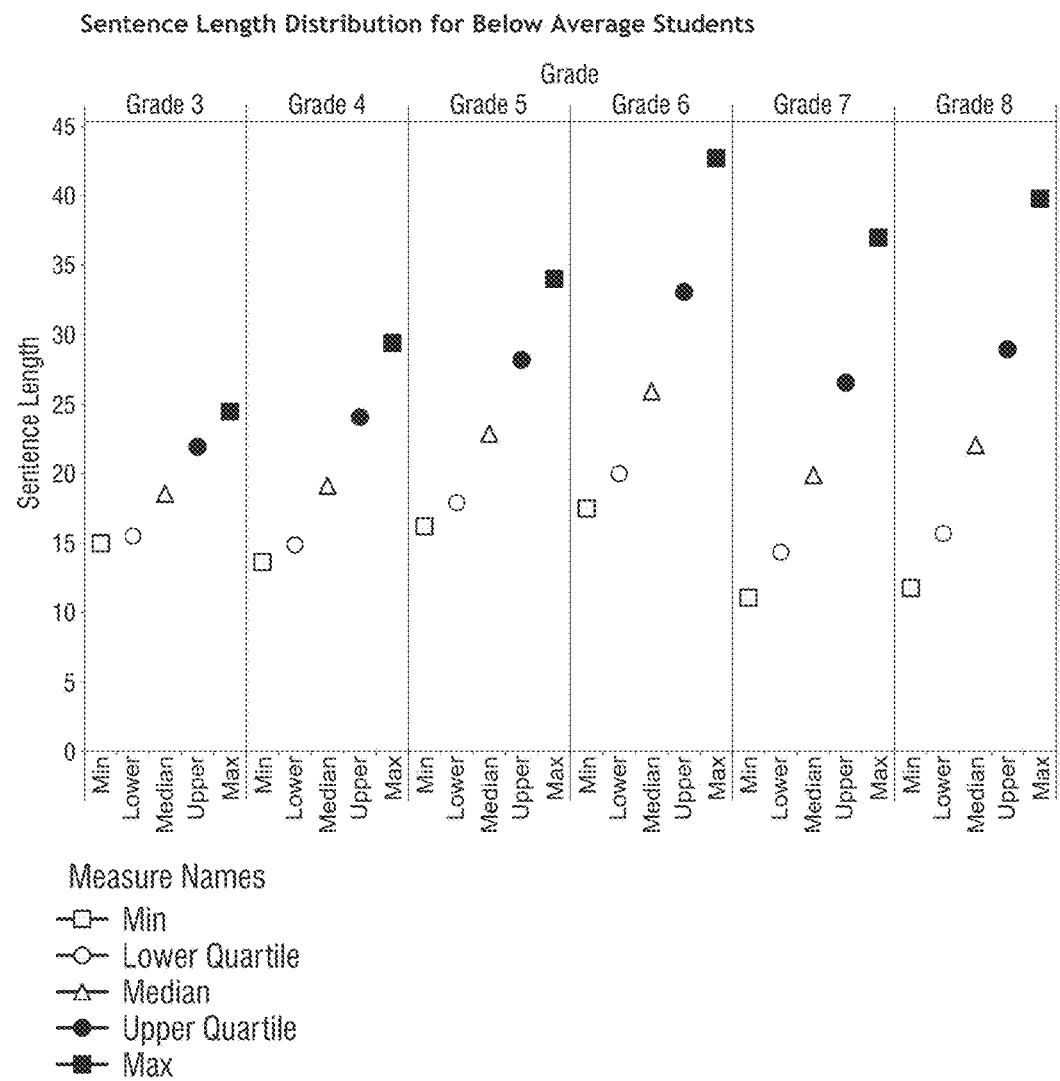
FIG. 18 is a pictorial representation of a sentence length distribution plot in accordance with an illustrative embodiment.
Figure 19:
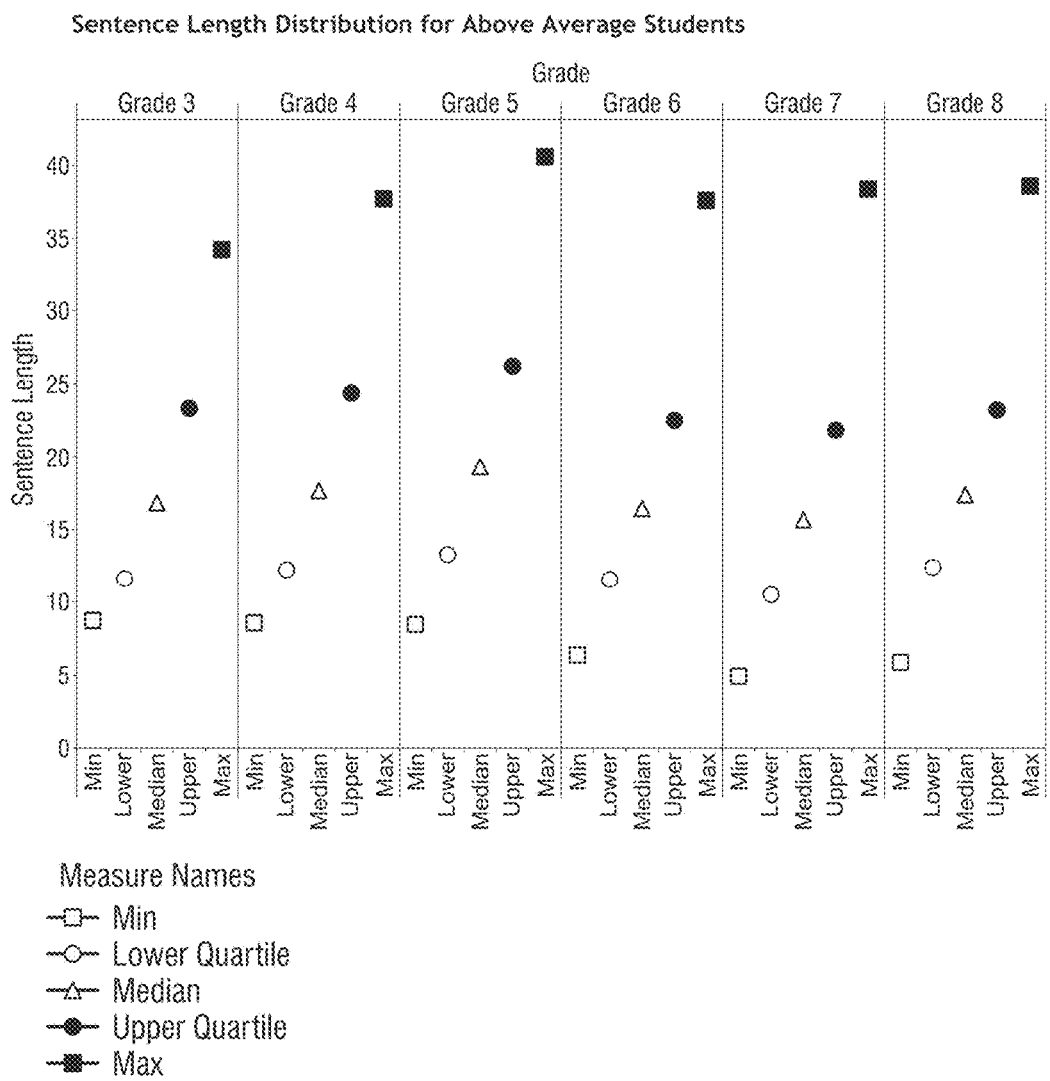
FIG. 19 is a pictorial representation of another sentence length distribution plot in accordance with an illustrative embodiment.

Visualizations of one or more of the processes, operations, functions and resulting parameters of the present disclosure are provided in FIGS. 6-19. As discussed previously, systems and methods of the present disclosure compare students between grades, so no variable that is used in the result is relative to just a single set of examinee responses. Most systems for automated test-grading produce scores on, for example, a scale from 1-6 where "6" represents the best score for a specific group of examinee responses 14. Because it is not clear how a fifth grader receiving a "6" and a twelfth grader receiving a "6" can be compared, such scores are not useful for the methods and systems of the present disclosure. Systems designed to evaluate textual complexity may not suffer from the same problems but suffer from others, for example, the attempt to evaluate multiple features of writing and combines these values in unspecified ways into a single score. The single score may not provide why an examinee response 14 scored as it did and therefore may not be beneficial. Therefore identifying an automated text analysis tool that uses computational linguistics to measure features of writing, from shallow (e.g., average word, sentence, paragraph, essay length, etc.) to complex (e.g., textual cohesion, concreteness, etc.). As a result, the methods and systems of the present disclosure provide models 26 both within and between grades, which includes visualizations showing change over time and variance within grades (see FIGS. 6-19). For purposes of illustration, FIG. 6 provides a plot of a number of adverbs versus grade level. The line represents the mean of the data and the area outside the line represents the spread of scores for a number of adverbs both above and below the mean. FIG. 7 provides another pictorial representation in the form of a plot of a dual axis representation where both Y-axes represent different scales (i.e., average noun number and value) versus grade level. Another rendition of FIG. 7 could include recalculated maximum and minimum lines to represent different values, such as standard deviation. FIG. 8 is a scatter plot with values for each essay aggregated together by grade and then each aggregated value is connected together with a line to represent each grade as pictorially represented by FIG. 9. This method offers a way to look for correlation between variables. FIG. 10 provides a pictorial representation of a dashboard for changing use of pronouns between grades and FIG. 11 a representation showing the change in the gerund density and temporal connectivities between fourth, fifth, and sixth grade. FIG. 12 provides a visual representation showing that as expository score increases, the density of adjectives in fourth grade student writing tends to increase. FIG. 13 is a set of pictorial representations for casual connectiveness versus developmental score, organizational score and language use score by grade level. FIG. 14 provides a visual representation of a sentence feature plot for such grades as 3, 4 and 5. The plot is broken up into categories along the X-axis which include, for example, sentence length, number of sentences, minimum, maximum, mode, and range. The value of these categories is indicated along the Y-axis for score categories including, for example, above average, average and below average. The representations provided in FIG. 14 are indicative of the variability found in student writing both within and between grades. According to at least one method of determining variability, the representations of average, minimum, maximum, mode, and range for student writing at different levels of proficiency is provided. By way of definition, minimum refers, for example, to the average size of the shortest sentence a student uses while maximum refers to the average longest sentence a student may use. The mode displays the most common sentence length in a student essay whereas the range is the average difference between the shortest and longest sentence. Although FIG. 14 is broken out to show only grades 3, 4 and 5, the present disclosure contemplates other categorically defined representations for the data associated with various grade levels including, for example, representing grades 3, 4, 5, 6, 7, and 8 Together (see FIG. 16) or grades 6, 7, and 8 (see FIG. 15) as a separate group from grades 3, 4, and 5 as pictorially represented in FIG. 14. At least FIGS. 14 and 15 provide pictorially represented evidence that better student writing is characterized by greater diversity in the length of sentences being used. Although better students use shorter sentences on average, they may also tend to feature the largest range of sentence lengths and, at least for the grades 3, 4, and 5, also use the longest sentences (but sparingly enough to still be using the shortest sentences on an average basis). Of the categories along the X-axis, range may be the most useful for showing that better students use a greater diversity of sentence lengths in their writing. For the plots shown in FIGS. 14, 15 and 16, range seems to be tied closely, for example, to the proficiency students gain between grades. It is at least one measure, if not possibly the only, that consistently shows an increase as students move between each grade. FIG. 17 is a pictorial representation of an average range plot for each grade, namely, grades 3-8, although other grades are contemplated. The X-axis provides the average score for each grade ranging from 0-12 and the Y-axis is the average range of the average score for each grade. Grades 3-8 are pictorially represented in separate plots from left to right. The size of the bubble within each grade of the plot is an indicator of the number of records as shown in the legend below the plot in FIG. 17. The gray scaling within each grade is representative of the number of sentences represented by each bubble. For example, the number of sentences may increase from 5-40 along this scale with lighter gray on the left representing five sentences and the darkest gray on the far right representing 40 and scales therebetween representing the number of sentences between 5-40. It can be derived from each of the individual plots for each of the grades that while range may be an important indicator of proficiency it appears to be more effective in the lower grades. FIG. 18 is an alternative method for pictorially representing the variance both within and between grades by using, for example, the minimum, lower quartile, median, upper quartile, and maximum indicators for categorical representations of sentence length distribution for below average students. The indicators were calculated, for example, by determining the length of each sentence in each essay, ordering the list of sentence lengths, and then determining the median by calculating the middle most value in the list. As represented, the lower quartile is the middle most value between the median and the minimum value. Conversely, the upper quartile is the middle most value between the median and the maximum value. According to at least one aspect of the present disclosure, scores were calculated for each essay then averaged together providing the pictorial representations in FIG. 18. Like FIG. 18, FIG. 19 includes an X-axis having indicators, such as, minimum, lower quartile, median, upper quartile, and maximum. These indicators are applied to each grade level, for example, ranging from grades 3-8. The Y-axis is an indicator of sentence length ranging, for example, from 0-40+. FIG. 19 provides a pictorial representation of sentence length distribution for above average students whereas FIG. 18 provides a pictorial representation of sentence length distribution for below average students. Both FIGS. 18 and 19 provide evidence, at least in one aspect of the present disclosure, that the best students use the greater diversity of sentence lengths. The pictorial representations provided in these figures provide a detailed view of the diversity of sentence lengths students are using in each grade and at each level of proficiency. Although the data is represented as a radar graph, range may be a more effective approach for use in a radar graph, although the sentence length distributions may still be valuable to use as separate visualizations given their ability to clarify differences between the most and least proficient students. Accordingly, aggregate models 26 contribute broadly to the understanding of writing proficiency and its development. Models 26 also improve instruction and targeted intervention at various curriculum levels. Improved individual instruction or targeted intervention may be accomplished using methods and systems of the present disclosure as an individual's writing profile is compared to an aggregate model 26. Improvement in test item and rubric development through an evidence-based understanding of student writing abilities and development of each greater assessment level may also be accomplished using methods and systems of the present disclosure. Improved test validity may also be accomplished as proficiency claims are able to be linked to empirical evidence. Furthermore, improved predictability of assessments may also be accomplished as claims of student readiness linked to test performance may be backed by empirically derived learning progressions.

Figure 20:
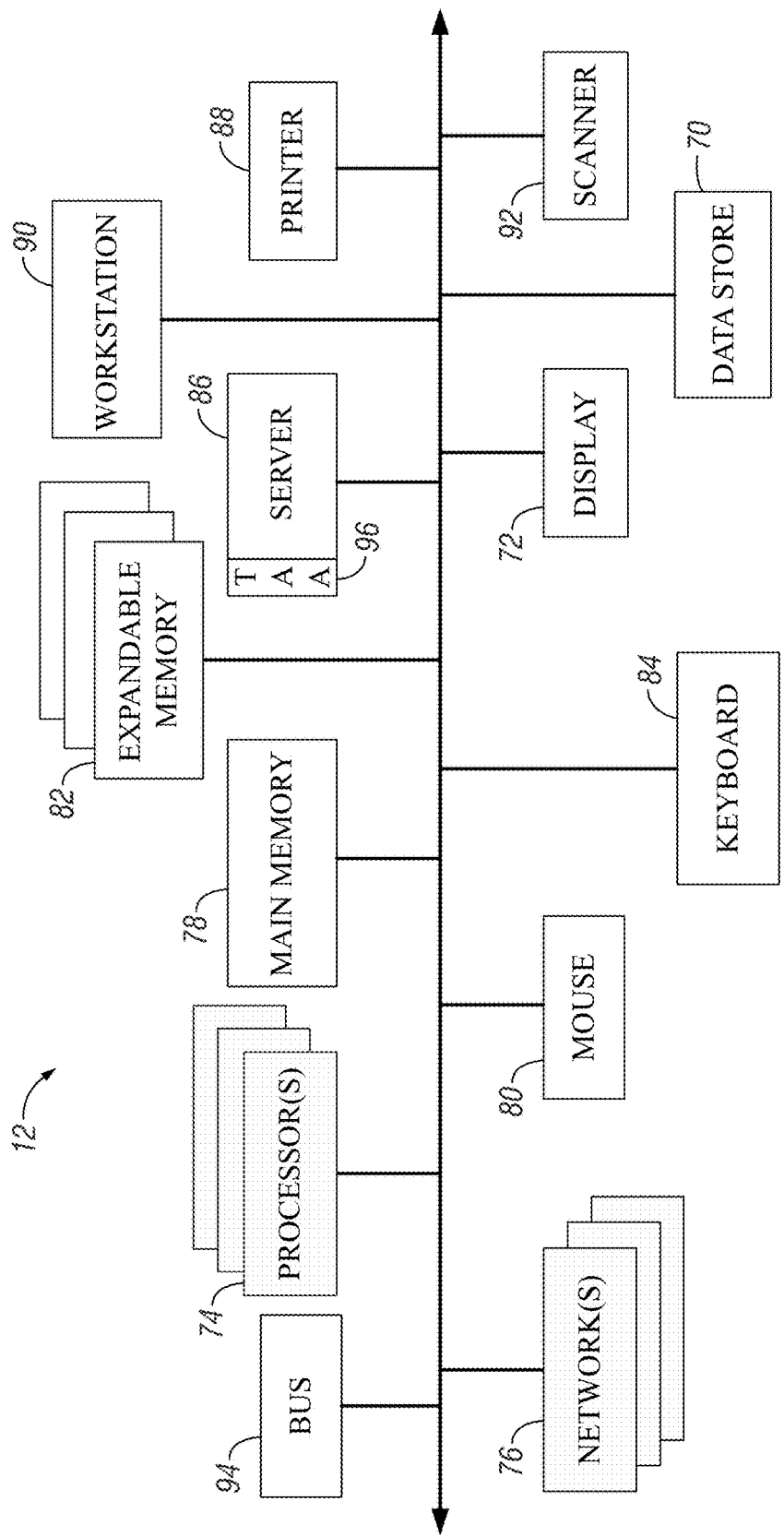
FIG. 20 is a pictorial representation of a block diagram for a master control system in which an embodiment of the invention may be implemented.

FIG. 20 is a block diagram of a master control system 12 in which an embodiment of the invention may be implemented. As shown in FIG. 20, the master control system 12 includes, for example, a server 86, workstation 90, scanner 92, a printer 88, a datastore 70, and network(s) 76. The computer network(s) 76 are configured to provide a communication path for each device of the master control system 12 to communicate with other devices. Additionally, computer network(s) 76 may be the internet, a public switchable telephone network, a local area network, private wide area network, wireless network, and any of the like. In various embodiments of the invention, a textual analysis application ("TAA") 96 of the present invention may be executed on the server 86 and/or workstation 90. For example, in one embodiment of the invention, the server 86 may be configured to execute the TAA 96, provide outputs for display to the workstation 90, and receive inputs from the workstation 90. In various other embodiments, the workstation 90 may be configured to execute the TAA for arriving at one or more output models 26 either individually or co-operatively with one or more workstations. The scanner 92 may be configured to scan textual content and output the content in a computer readable format. Additionally, the printer 88 may be configured to output the content to a print media, such as paper. Furthermore, data associated with examinee responses 14, data profiles 18, text mining 20, profiles 16, quantitative measures 22, qualitative evaluations 24, and the like, may be stored on the datastore 70. The datastore 70 may additionally be configured to receive and/or forward some or all of the stored data. Moreover, in yet another embodiment, some or all of the master control system 12 may be subsumed within a single device.

Although FIG. 20 depicts a computer network, it is to be understood that the invention is not limited to operation within a computer network, but rather, the invention may be practiced in any suitable electronic device. Accordingly, the master control system 12 pictorially represented in FIG. 20 is for illustrative purposes only and thus is not meant to limit the invention in any respect.

FIG. 20 also illustrates a block diagram of a master control system 12 in which an embodiment of the invention may be implemented. As shown in FIG. 20, the master control system 12 includes a processor 74, a main memory 78, a mouse 80, a keyboard 84, and a BUS 94. The BUS 94 may be configured to provide a communication path for each element of the master control system 12 to communicate with other elements. The processor(s) 74 may be configured to execute a software embodiment of the TAA 96. In this regard, a copy of computer executable code for the TAA 96 may be loaded in the main memory 78 for execution by the processor(s) 74. In addition to the computer executable code, the main memory may store data, including data from examining responses 14, data profiles 18, text mining 20, profile 16, quantitative measures 22, and qualitative evaluations 24. Furthermore, the main memory may store interpretative scaling formulas, algorithms or other theoretical solutions, optimization parameters or metrics, schemes, validations processes or codes, tables of data and any of the like. In operation, based on the computer executable code for an embodiment of the TAA 96, the processor(s) 74 may be received by a display adaptor (not shown) and converted into display commands configured to control the display 72. Furthermore, in a well-known manner, the mouse 80 and keyboard 84 may be utilized by a user to interface with the master control system 12. The network(s) 76 may include a network adaptor (not shown) configured to provide two-way communication between the network(s) 76 and the master control system 12. In this regard, the TAA 96 and/or data associated with the TAA 96 may be stored on the network(s) 76 and accessed by the master control system 12.

The present invention is not to be limited to the particular embodiments described herein. In particular, the present invention contemplates numerous variations in the type of ways in which embodiments of the invention may be applied to computer-implemented methods and systems for textual analysis by generating models of the progression of writing and writing abilities. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A computer-implemented method for generating models of writing abilities by applying a linguistic computational tool with a master control system server communicatively coupled to a data store and a graphical user interface, the method comprising:

obtaining, from the data store, multiple examinee-generated responses to corresponding test items generating, with the linguistic computational tool executed by the master control system server, one or more quality-neutral, data-based profiles of writing characteristics from a set of textual data points extracted from the examinee-generated responses by:

identifying indices of linguistic and discourse representations of the test items, wherein the indices comprise a description index, a scale index, a cohesion index, a language conventions index, or a demographics index;

text mining the multiple examinee-generated responses and applying an analytical rubric to each response to determine a quality score of the response for each index;

normalizing the quality scores based on one or more quality control measures;

aggregating the normalized quality scores into one or more aggregated score profile for a specified examinee proficiency, a specified examinee grade, or a specified set of examinee demographics; and mapping changes of the aggregated score profiles over specified time periods;

generating fine-grain models for identifying characteristics in at least one of: the identified indices, the text mined multiple examinee-generated responses, the normalized quality scores, the aggregated normalized quality scores, and the mapped changes of the aggregated score profiles over time;

correlating, linguistic computational tool executed by the master control system server, one or more quality-neutral, the one or more quality-neutral data-based profiles with one or more qualitative evaluations;

identifying improvements in an examinee's writing by analyzing relationships between the quality-neutral data-based profiles and the one or more qualitative evaluations based on the identified characteristics;

storing the improvements in the examinee's writing in the data store; and displaying, on the graphical user interface, an improvement recommendation based on the stored improvements in the examinee's writing.

2. The method of claim 1 further comprising:
correlating the one or more quality-neutral data-based profiles with the one or more qualitative evaluations by differentiating data from the one or more test items for at least one grade by qualitative performance.

3. The method of claim 1 further comprising:
correlating the one or more quality-neutral data-based profiles with the one or more qualitative evaluations by entering scores for one or more qualitative evaluations in a database of the one or more quality-neutral data-based profiles as one or more variables.

4. The method of claim 1, wherein the description index comprises a paragraph length parameter, a sentence length parameter, a word length parameter, a noun count parameter, a verb count parameter, an adjective count parameter, an adverb count parameter, a pronoun count parameter, or a word frequency parameter.

5. The method of claim 1, wherein the scale index comprises a simplicity and complexity parameter, a narrativity parameter, a word correctness parameter, a connectivity parameter, a syntactic pattern density parameter, or a readability parameter.

6. The method of claim 1, wherein the cohesion index comprises a referential cohesion parameter, a latent semantic relationship parameter, a casual cohesion parameter, or a lexical diversity parameter.

7. The method of claim 1, wherein the language conventions index comprises a grammatical error parameter, a word usage parameter, a mechanics parameter, or a style parameter.

8. The method of claim 1, wherein the normalizing based on quality control measures comprises analyzing a quality score distribution for each rater, a determined reliability for each rater, a mean score for each rater, or a standard deviation for each rater.

* * * * *